US009778515B2

(12) United States Patent
Wu et al.

(10) Patent No.: US 9,778,515 B2
(45) Date of Patent: Oct. 3, 2017

(54) ELECTRODE STRUCTURE, DISPLAY PANEL AND DISPLAY DEVICE

(71) Applicants: Xiamen Tianma Micro-Electronics Co., Ltd., Xiamen, Fujian Province (CN); Tianma Micro-Electronics Co., Ltd., Shenzhen, Guangdong Province (CN)

(72) Inventors: Ling Wu, Xiamen (CN); Boping Shen, Xiamen (CN); Qiong Song, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 69 days.

(21) Appl. No.: 14/302,392

(22) Filed: Jun. 11, 2014

(65) Prior Publication Data
US 2015/0177570 A1 Jun. 25, 2015

(30) Foreign Application Priority Data
Dec. 25, 2013 (CN) .......................... 2013 1 0727232

(51) Int. Cl.
G02F 1/1343 (2006.01)
(52) U.S. Cl.
CPC .............................. G02F 1/134309 (2013.01)

(58) Field of Classification Search
CPC ..................... G02F 1/133707; G02F 1/134309
See application file for complete search history.

(56) References Cited

U.S. PATENT DOCUMENTS

2015/0116644 A1* 4/2015 Morishita ......... G02F 1/133345
349/138
2015/0219973 A1* 8/2015 Kawashima ...... G02F 1/133345
349/43

FOREIGN PATENT DOCUMENTS

| CN | 202600316 U | 12/2012 |
| CN | 103852942 A | 6/2014 |
| KR | 20100118235 A | 11/2010 |
| WO | 2013168556 A1 | 4/2013 |

OTHER PUBLICATIONS

Office Action as issued in corresponding Chinese Application No. 201310727232.2, dated Jan. 4, 2016.

* cited by examiner

Primary Examiner — Edmond Lau
(74) Attorney, Agent, or Firm — Alston & Bird LLP

(57) ABSTRACT

An electrode structure having a corner area and a middle area is disclosed. The electrode structure includes at least two sub-electrodes, where at least one of a) a space between two adjacent sub-electrodes in the corner area is smaller than a space between the two adjacent sub-electrodes in the middle area, and b) at least one sub-electrode has a larger width in the corner area than a width of the sub-electrode in the middle area.

16 Claims, 5 Drawing Sheets

---Prior Art---

ELECTRODE STRUCTURE, DISPLAY PANEL AND DISPLAY DEVICE

CROSS-REFERENCES TO RELATED APPLICATIONS

This application claims the benefit of priority to Chinese Patent Application No. 201310727232.2 filed with the Chinese Patent Office on Dec. 25, 2013, and entitled "Electrodes Structure, Display Panel and Display Device", the content of which is incorporated herein by reference in its entirety.

TECHNICAL FIELD

The present invention relates to the field of display technologies and particularly to an electrode structure, a display panel and a display device.

BACKGROUND OF THE INVENTION

Liquid Crystal Display (LCD) has been widely applied to television sets, handsets, displays and other electronic products due to its light weight, thinness, low power consumption and other advantages.

In order to further improve a display effect of the liquid crystal display and enhance its transmissivity, the technology of Advanced-Super Dimensional Switching (ADS) has been widely applied to the liquid crystal displays, where pixel electrodes or common electrodes are set, in the ADS mode, as slit electrodes or plate-like electrodes as needed in practice, and a multidimensional electric field is formed by an electric field generated at the edges of the slit electrodes in the same plane and an electric field generated between the slit electrode layer and the plate-like electrode layer, so that liquid crystal molecules between the slit electrodes and above the electrodes in a liquid crystal cell can be rotated, to improve the operation efficiency of the liquid crystals and enhance the light transmission efficiency.

FIG. 1 is a schematic diagram of an electrode structure in the prior art, and as illustrated in FIG. 1, the existing electrode structure includes a corner area 1 and a middle area 2, where an electric field in the X direction may be generated by a vertical electrode 10 in the corner area, and an electric field in the Y direction may be generated by a transverse electrode 11 in the corner area, so that liquid crystal molecules can be rotated by both the electric field in the X direction and the electric field in the Y direction, to have light transmitted therethrough. However, when a display panel is subjected to an external force, the voltage in the pressed area may change, thus resulting in the change of the electric field in the X direction and the change of the electric field in the Y direction in the pressed area, so that the liquid crystal molecules may be abnormally rotated, resulting in the phenomenon of Trace mura, and the Trace mura generated in the corner area may be pushed by the external force to between pixels, resulting in a large number of Trace mura, and when the external force is removed, the liquid crystal molecules need to be restored to their initial arrangement, but it may be slow or impossible for them to be restored to the initial arrangement due to being hindered by the electric field in the Y direction, thus degrading a display effect.

BRIEF SUMMARY OF THE INVENTION

One inventive aspect is an electrode structure having a corner area and a middle area. The electrode structure includes at least two sub-electrodes, where at least one of a) a space between two adjacent sub-electrodes in the corner area is smaller than a space between the two adjacent sub-electrodes in the middle area, and b) at least one sub-electrode has a larger width in the corner area than a width of the sub-electrode in the middle area.

Another inventive aspect is a display panel, including an electrode structure having a corner area and a middle area. The electrode structure includes at least two sub-electrodes, where at least one of a) a space between two adjacent sub-electrodes in the corner area is smaller than a space between the two adjacent sub-electrodes in the middle area, and b) at least one sub-electrode has a larger width in the corner area than a width of the sub-electrode in the middle area.

Another inventive aspect is a display device, including a display panel, the display panel including an electrode structure having a corner area and a middle area. The electrode structure includes at least two sub-electrodes, where at least one of a) a space between two adjacent sub-electrodes in the corner area is smaller than a space between the two adjacent sub-electrodes in the middle area, and b) at least one sub-electrode has a larger width in the corner area than a width of the sub-electrode in the middle area.

DETAILED DESCRIPTION OF THE PREFERRED EMBODIMENTS

The technical solutions in the embodiments of the invention will be described below clearly and fully with reference to the drawings in the embodiments of the invention, and apparently the described embodiments are only a part but not all of the embodiments of the invention. Based on the embodiments of the invention here, all of other embodiments derived by those ordinarily skilled in the art without any inventive effort shall come into the scope of the invention.

An embodiment of the invention provides an electrode structure including a corner area 1 and a middle area 2, and the electrode structure includes at least two sub-electrodes, where a space between two adjacent sub-electrodes in the corner area 1 is smaller than a space between the two adjacent sub-electrodes in the middle area 2; and/or where at least one sub-electrode has a larger width in the corner area than a width of the sub-electrode in the middle area.

Figure 1:
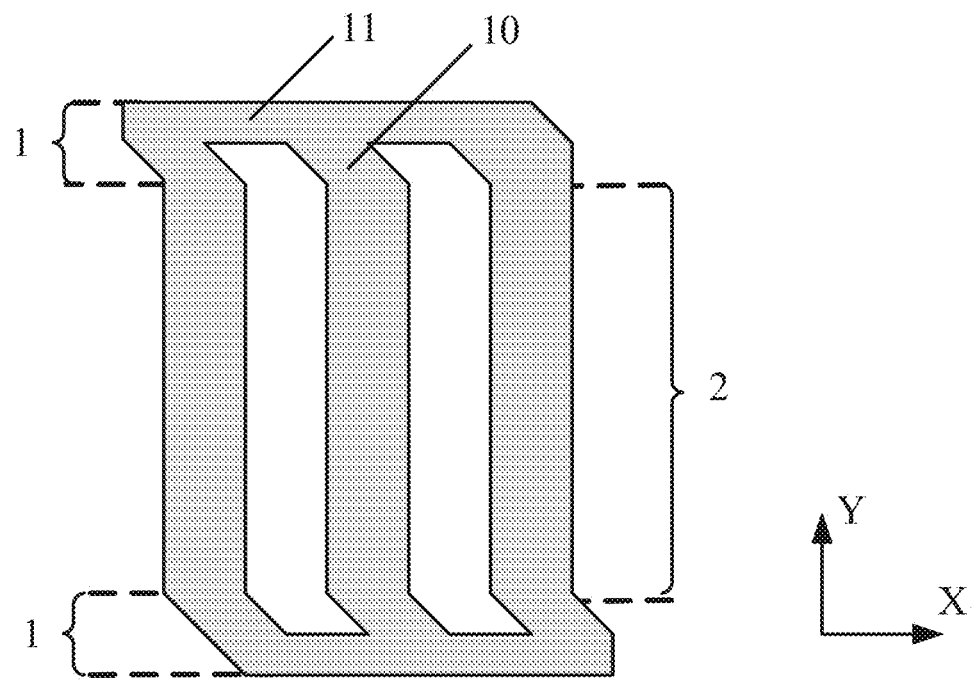
FIG. 1 illustrates a schematic diagram of an electrode structure in the prior art.
Figure 2A:
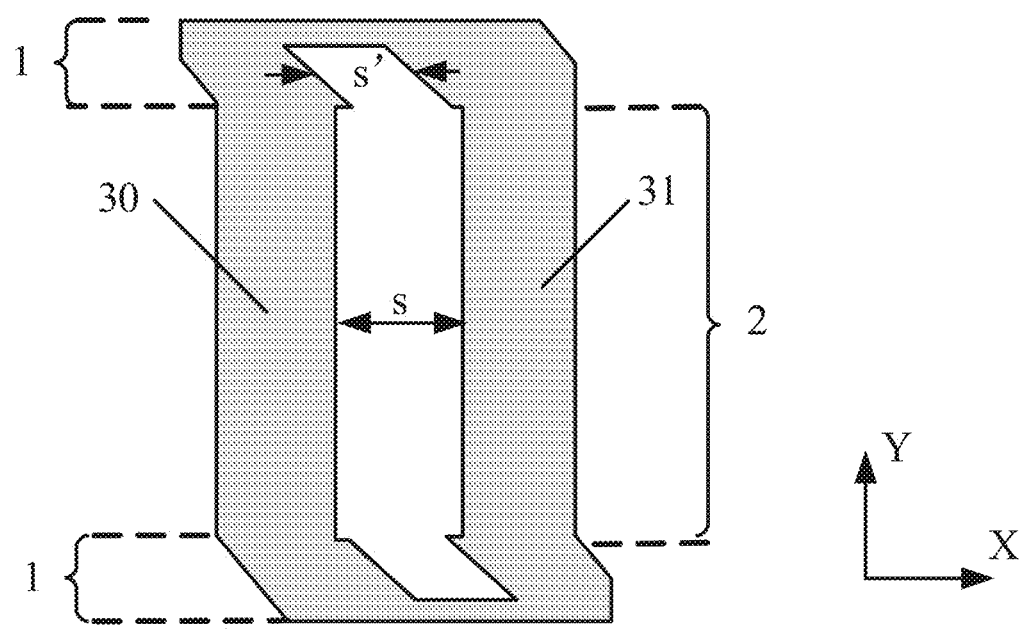
FIG. 2A to FIG. 2C illustrate schematic diagrams of electrode structures according to embodiments of the invention.

FIG. 2A illustrates a schematic diagram of an electrode structure according to an embodiment of the invention, as illustrated in FIG. 2A, the electrode structure includes two sub-electrodes including a sub-electrode 30 and a sub-electrode 31, which are two adjacent sub-electrodes, where a space s' between the sub-electrode 30 and the sub-electrode 31 in the corner area 1 is smaller than a space s between the sub-electrode 30 and the sub-electrode 31 in the middle area.

With the electrode structure according to the embodiment of the invention as illustrated in FIG. 2A, the intensity of an electric field in the X direction in the corner area can be increased by decreasing the space between the adjacent sub-electrodes in the corner area, so that the intensity of the electric field in the X direction is larger than the intensity of an electric field in the Y direction in the corner area, and when an external force resulting in Trace mura is removed, hindering by the electric field in the Y direction can be lowered, to facilitate restoration of liquid crystals to their initial arrangement, so as to improve the Trace mura and enhance a display effect.

Figure 2B:
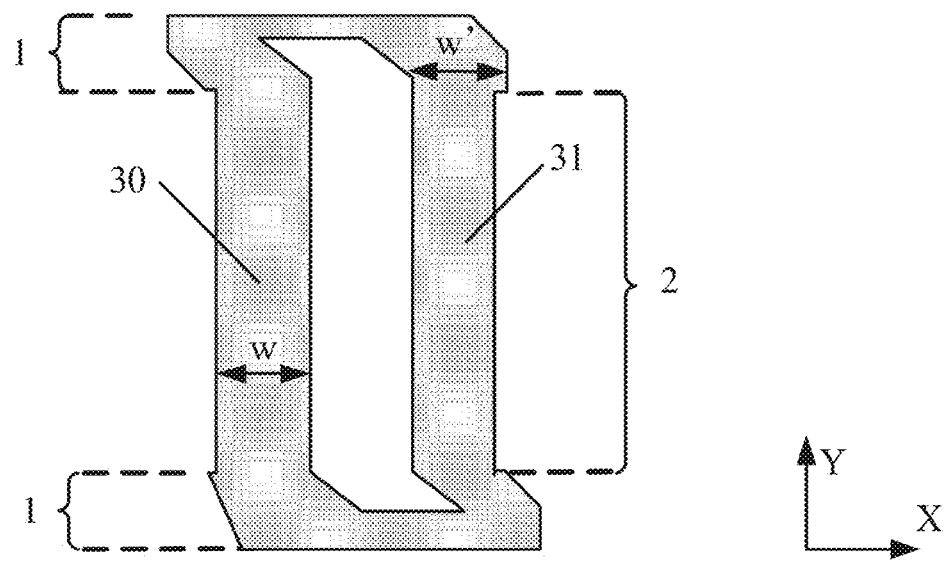

FIG. 2B illustrates a schematic diagram of another electrode structure according to an embodiment of the invention, as illustrated in FIG. 2B, the electrode structure includes two sub-electrodes including a sub-electrode 30 and a sub-electrode 31, which are two adjacent sub-electrodes, where a width w' of the sub-electrode 30 in the corner area 1 is larger than a width w of the sub-electrode 30 in the middle area, and the width w' of the sub-electrode 31 in the corner area 1 is larger than the width w of the sub-electrode 31 in the middle area.

It shall be noted that the widths of both the sub-electrode 30 and the sub-electrode 31 in the corner area are larger than their respective widths in the middle area in FIG. 2B, but this is merely illustrative, and in another embodiment of the invention, the width of one of the sub-electrode 30 and the sub-electrode 31 in the corner area may be set to be larger than its width in the middle area, so long as the intensity of the electric field in the X direction of the electrodes can be increased, and the embodiment of the invention will not be limited in this respect.

With the electrode structure according to the embodiment of the invention as illustrated in FIG. 2B, the intensity of the electric field in the X direction in the corner area can be increased by increasing the width of the sub-electrode in the corner area, so that the intensity of the electric field in the X direction is larger than the intensity of an electric field in the Y direction in the corner area, and when an external force resulting in Trace mura is removed, hindering by the electric field in the Y direction can be lowered, to facilitate restoration of liquid crystals to their initial arrangement, so as to improve the Trace mura and enhance a display effect.

Figure 2C:
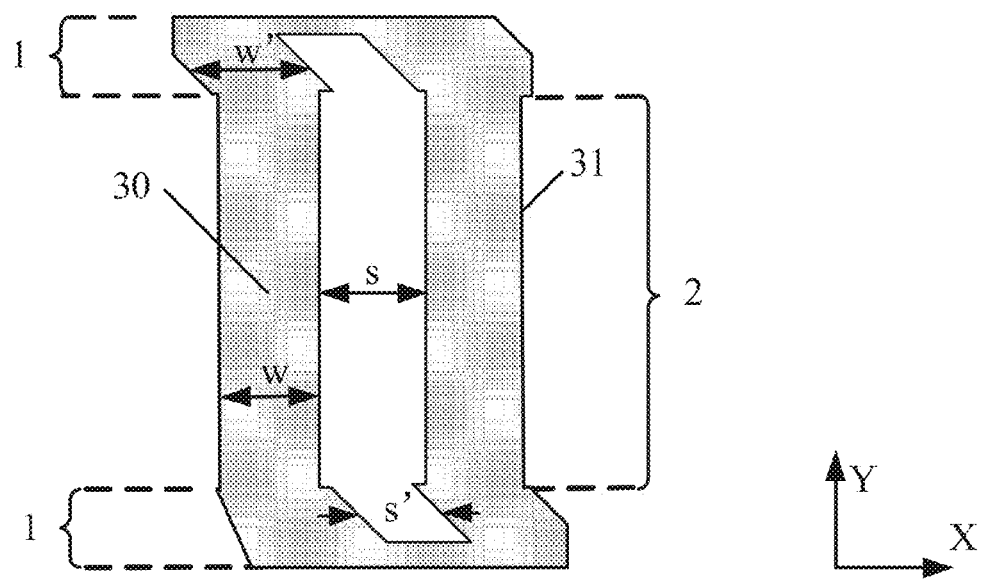

FIG. 2C illustrates a schematic diagram of another electrode structure according to an embodiment of the invention, as illustrated in FIG. 2C, the electrode structure includes two sub-electrodes including a sub-electrode 30 and a sub-electrode 31, which are two adjacent sub-electrodes, where the space s' between the sub-electrode 30 and the sub-electrode 31 in the corner area 1 is smaller than the space s between the sub-electrode 30 and the sub-electrode 31 in the middle area. Furthermore, the width w' of the sub-electrode 30 in the corner area 1 is larger than the width w of the sub-electrode 30 in the middle area, and the width w' of the sub-electrode 31 in the corner area 1 is larger than the width w of the sub-electrode 31 in the middle area.

With the electrode structure according to the embodiment of the invention as illustrated in FIG. 2C, the intensity of the electric field in the X direction in the corner area can be further increased by decreasing the space between the adjacent sub-electrodes in the corner area and increasing the width of the sub-electrode in the corner area, so that the intensity of the electric field in the X direction is larger than the intensity of the electric field in the Y direction in the corner area, and when an external force resulting in Trace mura is removed, hindering by the electric field in the Y direction can be lowered, to facilitate restoration of liquid crystals to their initial arrangement, so as to improve the Trace mura and enhance a display effect.

The embodiments of the invention will be described below by way of an example in connection with their applications regarding how the electrode structure described above can improve Trace mura and improve a display effect.

Generally, the width of the sub-electrode in a slit-like electrode is set to be 3.5 μm, and the space between adjacent sub-electrodes is set to be 3.5 μm, and in an embodiment of the invention, an angle between the corner area 1 and the vertical direction is 25°~40°, the width of the sub-electrode in the middle area is from 1.5 to 3.5 μm, and the space between two adjacent sub-electrodes in the middle area is from 1.5 to 4.5 μm, while ensuring the transmissivity without further complicating a process.

Furthermore, in an embodiment of the invention, the difference between the width of the sub-electrode in the corner area and the width of the sub-electrode in the middle area is from 0.3 to 1 μm, while improving Trace mura in the corner area and enhancing a display effect without further complicating a process.

Furthermore, in an embodiment of the invention, the difference between the space between two adjacent sub-electrodes in the middle area and the space between the two adjacent sub-electrodes in the corner area is from 0.3 to 1 μm, while improving Trace mura in the corner area, ensuring the transmissivity and improving a display effect without further complicating a process.

Furthermore, in an embodiment of the invention, the space between adjacent sub-electrodes in the corner area may be decreased and/or the width of the sub-electrode in the corner area may be increased, while maintaining the width of the sub-electrode and the space between the sub-electrodes in the middle area, to ensure the transmissivity while improving Trace mura.

Figure 3A:
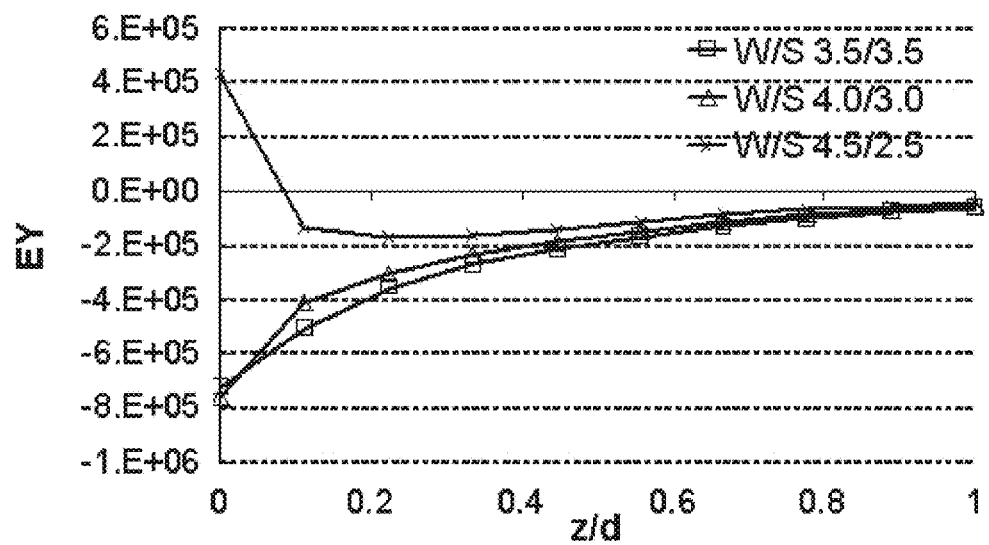
FIG. 3A illustrates a schematic diagram of an intensity EY profile of an electric field in the Y direction in a corner area with respect to different electrode widths and spaces.

Specifically, in an embodiment of the invention, the relationship between the width of the sub-electrode and the space between the adjacent sub-electrodes in the middle area is defined as w/s, and the relationship between the width of the sub-electrode and the space between the adjacent sub-electrodes in the corner area is defined as w'/s'. FIG. 3A illustrates a schematic diagram of an intensity EY profile of the electric field in the Y direction in the corner area with respect to different w'/s' depicted in Table 1; and FIG. 3B illustrates a schematic diagram of an inverted angle of liquid crystal molecules with respect to the different w'/s' depicted in Table 1.

TABLE 1

|  | Design1 | Design2 | Design3 |
| --- | --- | --- | --- |
| w'/s' | 3.5/3.5 | 4.0/3.0 | 4.5/2.5 |

Figure 3B:
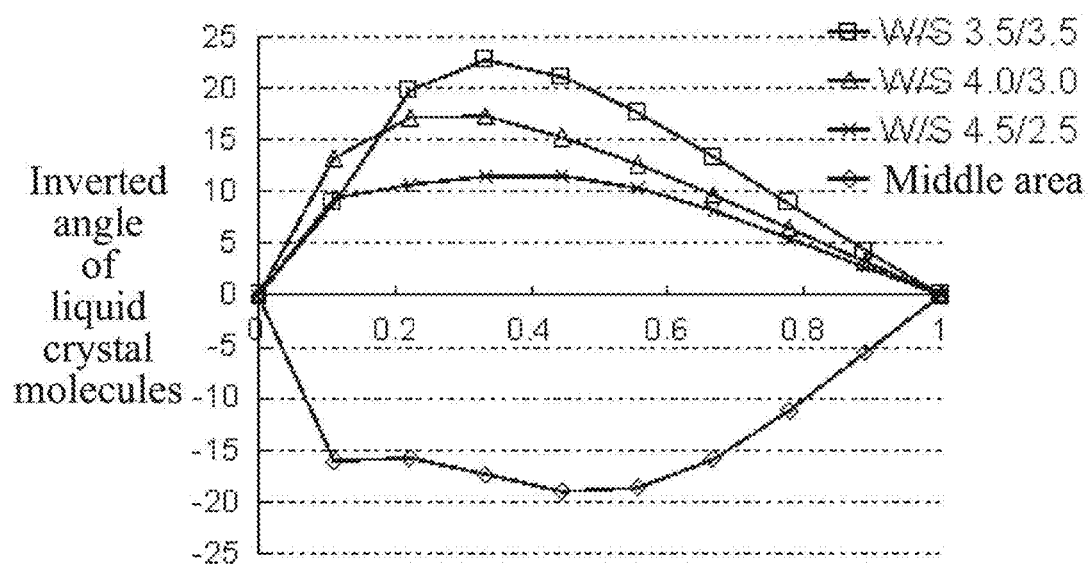
FIG. 3B illustrates a schematic diagram of an inverted angle of liquid crystal molecules in the corner area with respect to the different electrode widths and spaces.

As can be apparent from FIG. 3A and FIG. 3B, when the relationship between the width of the sub-electrode and the space between the sub-electrodes in the corner area is set as 4.5/2.5, the intensity EY of the electric field in the Y direction is decreased and also the inverted angle of the liquid crystal molecules is decreased, so an increased width of the sub-electrode in the corner area and a decreased space between the adjacent sub-electrodes can come with a decreased intensity of the electric field in the Y direction and a decreased inverted angle of the liquid crystal molecules, so as to improve the phenomenon of Trace mura and enhance a display effect.

Figure 4A:
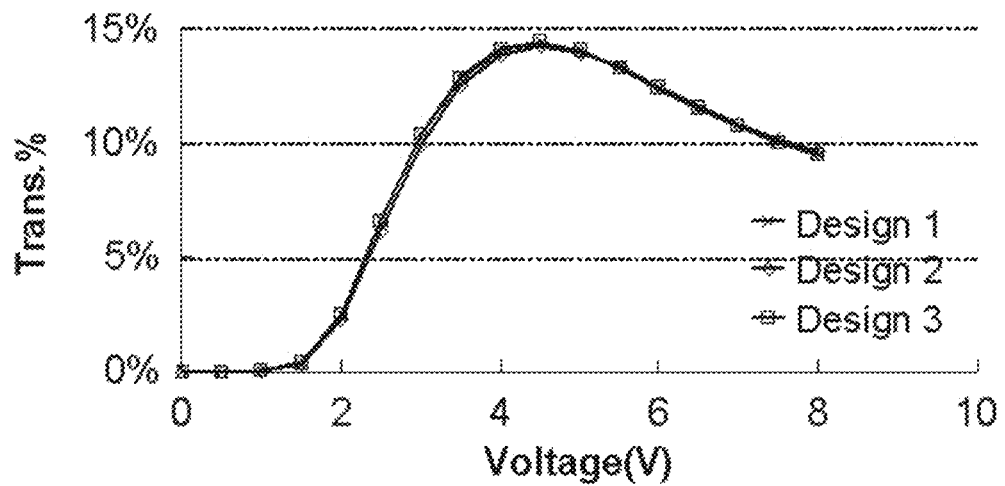
FIG. 4A and FIG. 4B illustrate schematic diagrams of transmissivity profiles with respect to different electrode widths and spaces.
Figure 4B:
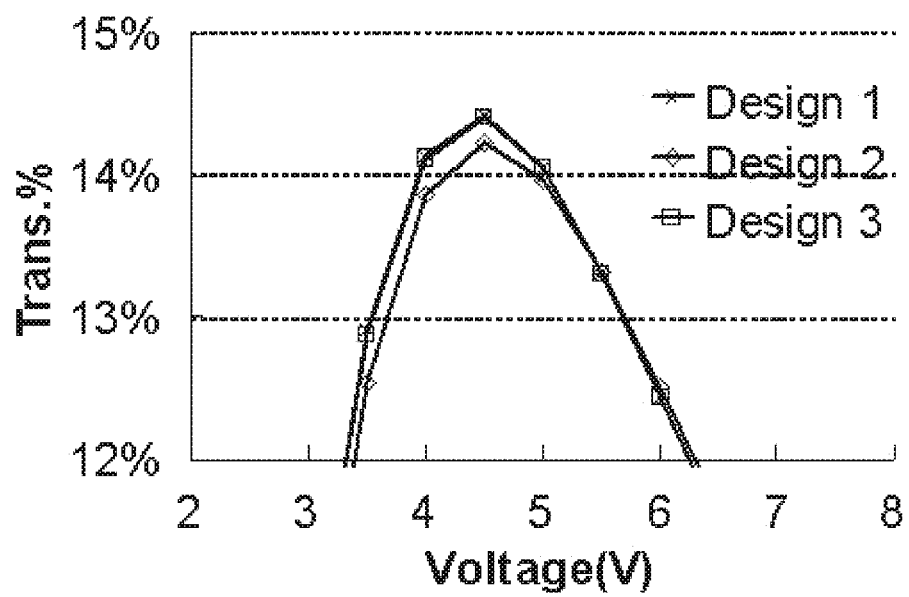

FIG. 4A and FIG. 4B illustrate schematic diagrams of transmissivity profiles with respect to different w/s and w'/s' depicted in Table 2.

TABLE 2

|  | Design1 | Design2 | Design3 |
|---|---|---|---|
| w/s | 3.5/3.5 | 4.0/3.0 | 3.5/3.5 |
| w'/s' | 3.5/3.5 | 4.0/3.0 | 4.0/3.0 |

In Table 2, the widths of sub-electrodes and the spaces between the sub-electrodes are the same in the middle area as in the corner area in Design1; the widths of sub-electrodes are increased in both the middle area and the corner area and the spaces between the sub-electrodes are decreased in both the middle area and the corner area in Design2; and the width of the sub-electrode and the space between the sub-electrodes in the middle area are maintained, and the width of the sub-electrode in the corner area is increased while decreasing the space between the sub-electrodes in the corner area in Design3. FIG. 4B is an enlarged diagram of a part in FIG. 4A as denoted by M, and as can be apparent from FIG. 4B, the scheme of Design3 can be adopted to increase the transmissivity.

In an embodiment of the invention, the electrode structure preferably includes 2 to 4 sub-electrodes, and of course, the invention will not be limited thereto, and further preferably the electrode structure includes at least three sub-electrodes arranged in sequence in an embodiment of the invention.

In a preferred embodiment of the invention, when the space between two adjacent sub-electrodes in the corner area is maintained smaller than the space between the two adjacent sub-electrodes in the middle area, a middle sub-electrode located in the middle, whose width in the corner area is set to be larger than that in the middle area; and two sub-electrodes next to the middle sub-electrode, whose widths in the corner area are set to be equal to their respective widths in the middle area and equal to the width of the middle sub-electrode in the middle area.

Figure 5:
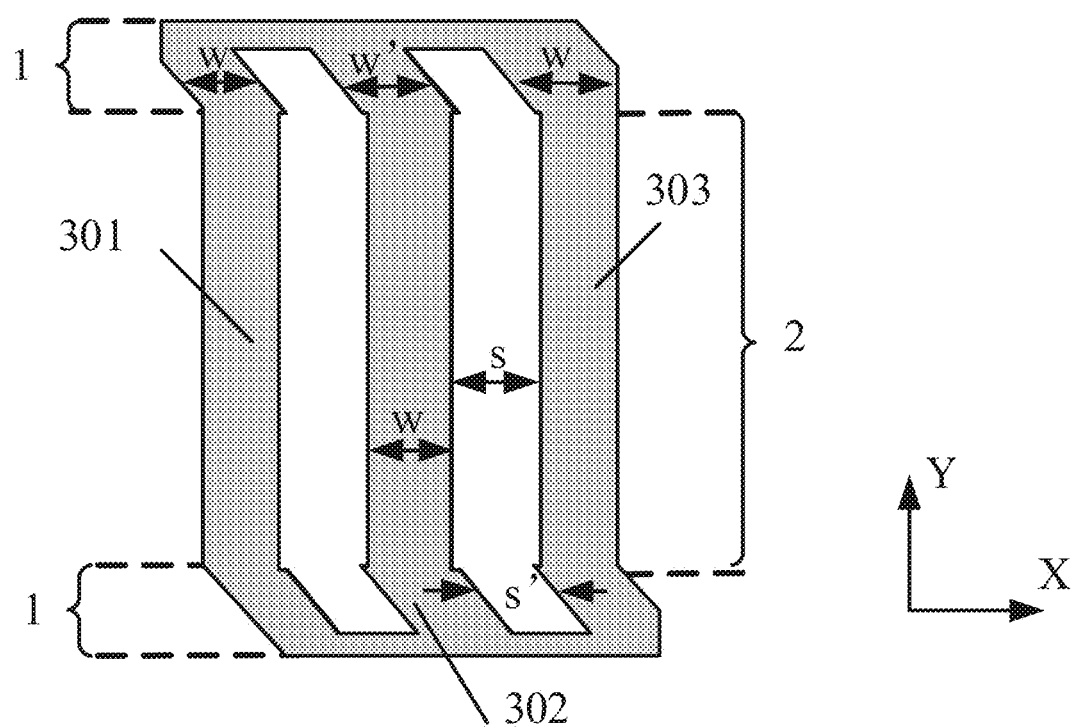
FIG. 5 illustrates a schematic diagram of another electrode structure according to an embodiment of the invention.

FIG. 5 illustrates a schematic diagram of still another electrode structure according to an embodiment of the invention, as illustrated in FIG. 5, the electrode structure includes three sub-electrodes arranged in sequence including a sub-electrode 301, a sub-electrode 302 and a sub-electrode 303, where the sub-electrode 302 is located in the middle and is referred to as a middle sub-electrode, and the sub-electrode 301 and the sub-electrode 303 are located next to the middle sub-electrode.

With the foregoing design method according to the embodiment of the invention, as embodied in FIG. 5, the space s' between the sub-electrode 301 and the sub-electrode 302 in the corner area is smaller than the space s between the sub-electrode 301 and the sub-electrode 302 in the middle area, the space s' between the sub-electrode 302 and the sub-electrode 303 in the corner area is smaller than the space s between the sub-electrode 302 and the sub-electrode 303 in the middle area, the width w' of the middle sub-electrode 302 in the corner area is larger than the width w of the middle sub-electrode 302 in the middle area, and the widths of the sub-electrode 301 and the sub-electrode 303 in the corner area are equal to their respective widths in the middle area and equal to the width of the middle sub-electrode 302 in the middle area, that is, w. In other words, with the embodiment of the invention, the width of the middle sub-electrode in the corner area is increased while maintaining the widths of the two sub-electrodes next thereto, to increase the intensity of the electric field in the X direction and decrease the intensity of the electric field in the Y direction in the corner area, improve the phenomenon of Trace mura and enhance a display effect while simplifying a process.

It shall be noted that the electrode structure in FIG. 5 has been described as including three sub-electrodes in the embodiment of the invention only by way of an example but will not be limited thereto and may include, for example, four sub-electrodes.

It shall be further noted that sub-electrodes in both upper and lower corner areas in the electrode structure can be manufactured in the same design scheme, i.e., symmetrically, in an embodiment of the invention, to simplify a manufacture process, for example, the widths of the sub-electrodes can be increased in both the upper and lower corner areas or the spaces between the sub-electrodes can be decreased in both the upper and the lower corner areas. Of course, asymmetrical design scheme may be adopted, for example, the width of the sub-electrode can be increased in the upper corner area and the space between the sub-electrodes can be decreased in the lower corner area for the same electrode structure. The embodiment of the invention will not be limited to any particular design scheme, so long as the phenomenon of Trace mura can be improved in both the upper and the lower corner areas.

An embodiment of the invention further provides a display panel including the electrode structure according to the foregoing embodiment, where the particular electrode structure is the same as the electrode structure according to the foregoing embodiment, so a repeated description thereof will be omitted here.

An embodiment of the invention further provides a display device including the display panel as described above, where the display panel includes the electrode structure according to the foregoing embodiment, and a reference can be made to the electrode structure according to the foregoing embodiment, so a repeated description thereof will be omitted here.

With the electrode structure, the display panel and the display device according to the embodiments of the invention, the intensity of an electric field in the X direction in the corner area can be larger than the intensity of an electric field in the Y direction in the corner area by decreasing the space between two adjacent sub-electrodes in the corner area and/or increasing the width of the sub-electrode in the corner area while maintaining the width of the sub-electrode in the middle area and the space between the adjacent sub-electrodes in the middle area in the electrode structure, so that when an external force resulting in Trace mura is removed, hindering by the electric field in the Y direction can be lowered, to facilitate restoration of liquid crystals to their initial arrangement, so as to improve the Trace mura, increase the transmissivity and enhance a display effect.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An electrode structure, applied in a liquid crystal display device, comprising:
   a liquid crystal layer sandwiched between two substrates;
   an electrode layer deposited on one of the substrates, having a corner area and a middle area, wherein the gap between the two adjacent sub-electrodes in the corner area has an uniform width, and tin the middle area have an uniform width; and the gap between the two adjacent sub-electrodes in the middle area has an uniform width; and
   at least two sub-electrodes, wherein:
   a) the gap between two adjacent sub-electrodes in the corner area is smaller than the gap between the two adjacent sub-electrodes in the middle area,
   b) at least one sub-electrode has a larger width in the corner area than a width of the sub-electrode in the middle area.

2. The electrode structure according to claim 1, wherein the electrode structure comprises at least three sub-electrodes arranged in sequence, and wherein the gap between two adjacent sub-electrodes in the corner area is smaller than the gap between the two adjacent sub-electrodes in the middle area, and wherein:
   a middle sub-electrode located between two other sub-electrodes, has the width in the corner area which is larger than the width of the middle sub-electrode in the middle area; and
   the two other sub-electrodes have widths in the corner area which are equal to their respective widths in the middle area and are equal to the width of the middle sub-electrode in the middle area.

3. The electrode structure according to claim 1, wherein a difference between the width of the sub-electrode in the corner area and the width of the sub-electrode in the middle area is between about 0.3 μm and about 1 μm.

4. The electrode structure according to claim 3, wherein a difference between the gap between the two adjacent sub-electrodes in the middle area and the gap between the two adjacent sub-electrodes in the corner area is between about 0.3 μm and about 1 μm.

5. The electrode structure according to claim 4, wherein the width of the sub-electrode in the middle area is between about 1.5 μm and about 3.5 μm.

6. The electrode structure according to claim 5, wherein the gap between the two adjacent sub-electrodes in the middle area is between about 1.5 μm and about 4.5 μm.

7. The electrode structure according to claim 2, wherein a difference between the width of the sub-electrode in the corner area and the width of the sub-electrode in the middle area is between about 0.3 μm and about 1 μm.

8. The electrode structure according to claim 7, wherein a difference between the gap between the two adjacent sub-electrodes in the middle area and the gap between the two adjacent sub-electrodes in the corner area is between about 0.3 μm and about 1 μm.

9. The electrode structure according to claim 8, wherein the width of the sub-electrode in the middle area is between about 1.5 μm and about 3.5 μm.

10. The electrode structure according to claim 9, wherein the gap between the two adjacent sub-electrodes in the middle area is between about 1.5 μm and about 4.5 μm.

11. The electrode structure according to claim 1, wherein the width of the sub-electrode in the middle area is between about 1.5 μm and about 3.5 μm.

12. The electrode structure according to claim 11, wherein the gap between the two adjacent sub-electrodes in the middle area is between about 1.5 μm and about 4.5 μm.

13. The electrode structure according to claim 1, wherein the sub-electrode is a pixel electrode or a common electrode.

14. A display panel, comprising:
    a display media layer sandwiched between two substrates; and
    an electrode layer with an electrode structure deposited on one of the substrates;
    wherein the electrode structure has a corner area and a middle area and comprises at least two sub-electrodes, wherein:
    a) a gap between two adjacent sub-electrodes in the corner area is smaller than a gap between the two adjacent sub-electrodes in the middle area, and
    b) at least one sub-electrode has a larger width in the corner area than a width of the sub-electrode in the middle area; and
    wherein the gap between two adjacent sub-electrodes in the corner area has uniform width, and the gap between the two adjacent sub-electrodes in the middle area has an uniform width.

15. The electrode structure according to claim 14, wherein the electrode structure comprises at least three sub-electrodes arranged in sequence, and wherein the gap between two adjacent sub-electrodes in the corner area is smaller than the gap between the two adjacent sub-electrodes in the middle area, and wherein:
    a middle sub-electrode located between two other sub-electrodes, has a width in the corner area which is larger than a width of the middle sub-electrode in the middle area; and
    the two other sub-electrodes have widths in the corner area which are equal to their respective widths in the middle area and are equal to the width of the middle sub-electrode in the middle area.

16. The electrode structure according to claim 14, wherein a difference between the width of the sub-electrode in the corner area and the width of the sub-electrode in the middle area is between about 0.3 μm and about 1 μm.

* * * * *